(No Model.)
O. SEELY.
BICYCLE STAND.
No. 559,312.  Patented Apr. 28, 1896.
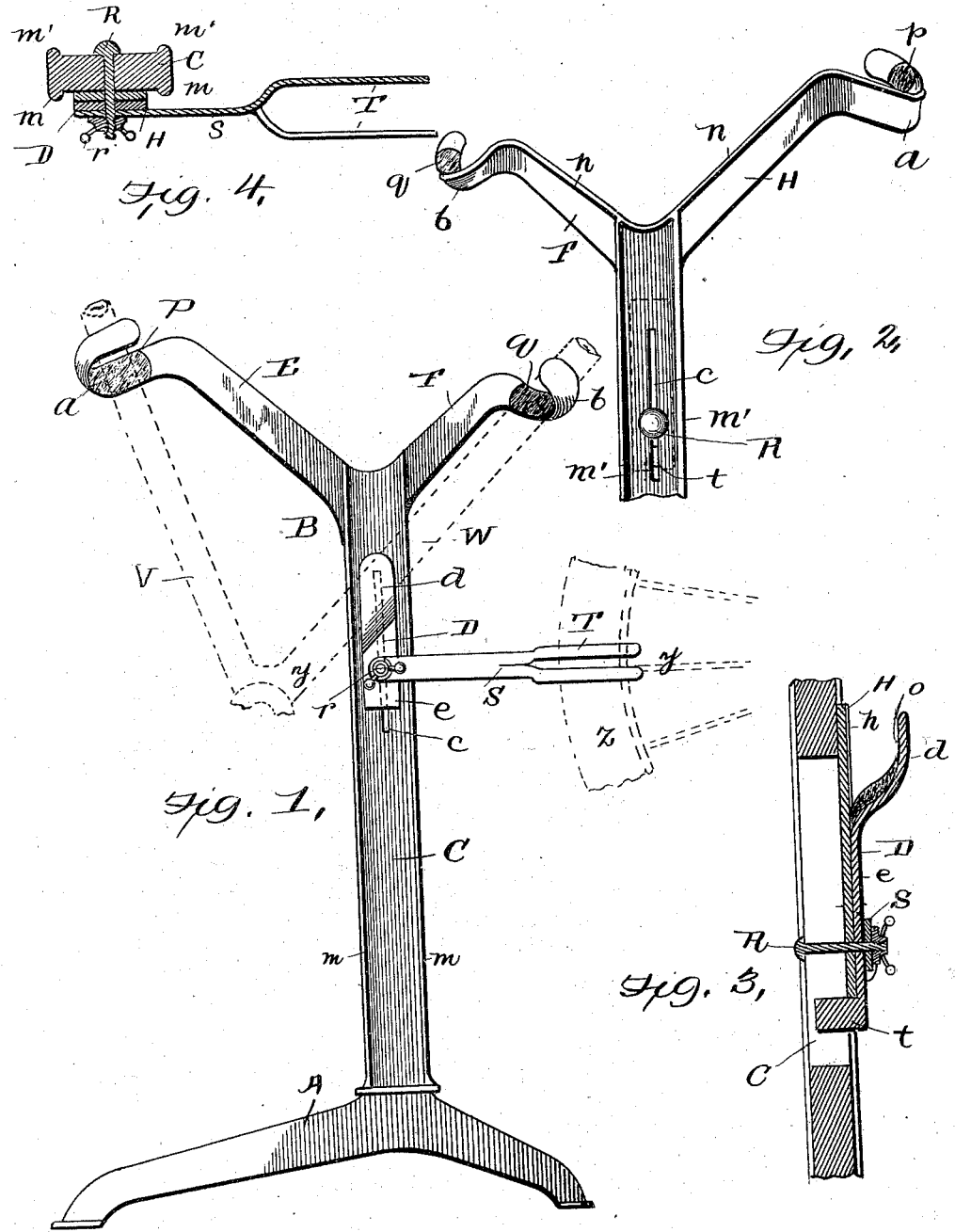
Witnesses-
C. K. Davies.
James E. Jester.
Inventor-
Obadiah Seely
B. A. Wilkinson
atty.

UNITED STATES PATENT OFFICE.

OBADIAH SEELY, OF SYRACUSE, NEW YORK, ASSIGNOR TO E. C. STEARNS & CO., OF SAME PLACE.

BICYCLE-STAND.

SPECIFICATION forming part of Letters Patent No. 559,312, dated April 28, 1896.

Application filed June 14, 1895. Serial No. 552,827. (No model.)

*To all whom it may concern:*

Be it known that I, OBADIAH SEELY, a citizen of the United States, residing at Syracuse, in the county of Onondaga and State of New York, have invented a new and useful Bicycle-Stand; and I do hereby declare that the following, in connection with the accompany drawings, is a full, clear, and exact description of the invention.

The object of my invention is to provide a support or stand for a bicycle on which the bicycle may be set when not in use, so as to be supported firmly and conveniently.

My new support consists, essentially, of a standard provided with legs at the lower end and at the upper end with two arms extending upwardly in the same vertical plane, one inclined forward and one rearward and having at their upper ends hooks in which the tubes of the bicycle-frame rest; also, a third hook vertically adjustable on the standard in the same plane as the two arms; also, where desired, a fork capable of vertical adjustment on the standard and of adjustment at an angle with reference thereto.

My invention will be better understood by reference to the accompanying drawings, in which the same letters refer to similar parts in all the views.

Figure 1 is a front elevation of my novel support, portions of the bicycle when supported thereon being indicated by dotted lines. Fig. 2 is a rear elevation of the upper part of the support. Fig. 3 is a vertical section of a portion of the upper part of the support on line $x\,x$. Fig. 4 is a cross-section on line $y\,y$.

Referring to the drawings, A and B are the two main parts of the stand, each preferably cast in one piece, A being provided with three or more legs, B being attached thereto in any convenient manner, as by a bolt. B consists of a vertical shaft C, having at its upper end two arms E F, extending upwardly and at an angle to each other equal to or a little greater than a right angle. These arms extend one forwardly and one rearwardly in the same vertical plane and are provided each with a hook at its end, the arm E with the hook $a$ turned at about right angles to it and curved on the interior, so as to fit the vertical tube of the frame, and F provided with a similar hook $b$ to fit substantially the lower tube of the frame $w$. These hooks are so formed that B may be cast in one piece and without cores to form the hooks.

D is a detached piece, with its upper portion $d$ bent outward in the form of a hook, with an inclination downward toward the left, as shown in Fig. 1, adapted also to fit the lower tube W of the bicycle. D is vertically adjustable on the shaft C by means of bolt R on which it is threaded, taking in slot $c$ in the shaft. D is also provided at its lower end with the guide $f$, fitting in $c$. On R is also threaded the back piece H, provided at lower end with slot fitting $f$ and adjustable vertically simultaneously with hook D. H is arranged, as best shown in Fig. 3, so that the tube of the bicycle is received and held between its upper end $h$ and the upper end $d$ of D, so that the bicycle is carried clear of the ribs $m\,m$ and is not liable to rub against them. On R is also threaded the fork S with tines T adjustable vertically simultaneously with D and H, and also with bolt R as a center, having an adjustment at any angle to C, so as to receive between its forks tire of the front wheel Z. These parts D, H, and S being threaded on R are adjustable simultaneously at the desired elevation and are secured at the desired point by tightening the thumb-piece $r$, screw-threaded on R, the head of R engaging with the back of C.

The inner surfaces of the hooks $a$, $b$, and $d$ are lined, respectively, with felt or other soft material $p\,q\,o$, and the inner surface $h$ of H is also similarly lined to prevent scratching or injuring the enamel on the bicycle.

B may be strengthened by ribs $m\,m$ on its face and ribs $m'\,m'$ and $n$ on its rear.

Referring particularly to Fig. 1, (in which portions of the bicycle in position on the support are indicated by dotted lines, the crank-hanger U, the upright V, the lower tube W, and the front tire Z,) it will be seen that the two arms E F are arranged at an angle of ninety degrees, or a little more, with reference to each other, E being made preferably a little longer. By this construction my support is adapted to fit any modern wheel, the upright resting in $a$, bottom tube in $b$, and U dropping below junction of arms E F and to left, as here shown. When it is desired to use the support, the bicycle is set in place with V resting in $a$ and W in $b$, the thumb-piece having been previously loosened so that bolt R with parts threaded thereon drop to bottom of slot $c$. D and H are then adjusted vertically to engage with the lower tube W, S is swung to engage front tire Z between its tines, and the thumb-piece is then tightened, by which means all the parts are clamped firmly in position and the bicycle is held firmly in an elevated position, so that its front wheel and handle cannot twist around, but that the pedals and rear wheel are left free to rotate. The bicycle is thus sustained firmly and conveniently for any desired position in house, club, or for display in a store, and the stand with the wheel set on it may be easily moved from place to place when desired.

Having thus fully described my invention, what I claim, and desire to protect by Letters Patent, is—

In a bicycle-support, the combination with a standard secured to a suitable base and provided with two oppositely upwardly-inclined arms rigid with the standard, each arm terminating with a hook adapted to support different portions of the frame, of a vertically-adjustable back plate attached to said standard by means of a confining-bolt passing through a slot in the standard, a vertically-adjustable support pivoted on said bolt and provided at its upper end with a hook to support the lower bar of the frame and at its lower end with a guide operating in the slot in the standard, and a fork also pivoted on the bolt and vertically adjustable with said back plate and support, substantially as specified.

In witness whereof I have hereunto set my hand, in the presence of two attesting witnesses, at Syracuse, in the county of Onondaga, in the State of New York, this 15th day of April, 1895.

OBADIAH SEELY.

Witnesses:
M. E. SKINNER,
ALFRED WILKINSON.